United States Patent [19]

Hatfield, Jr. et al.

[11] 3,912,600

[45] Oct. 14, 1975

[54] RECOVERY OF POLYMETHYLENE POLYPHENYL POLYISOCYANATE FROM A PHOSGENATED POLYAMINE FEED

[75] Inventors: Richard Hatfield, Jr., Pasadena; Howard R. Steele, Baytown, both of Tex.

[73] Assignee: The Upjohn Company, Kalamazoo, Mich.

[22] Filed: May 9, 1974

[21] Appl. No.: 468,246

[52] U.S. Cl. ............... 203/73; 260/453 SP; 203/88
[51] Int. Cl.² ...................... B01D 3/00; B01D 3/10
[58] Field of Search ............ 203/28, 49, 67, 71, 73, 203/80, 94, 98, 50, 88; 260/453 SP

[56] References Cited
UNITED STATES PATENTS

| | | | |
|---|---|---|---|
| 3,544,611 | 12/1970 | Michelet et al. | 203/80 |
| 3,549,504 | 12/1970 | Adica et al. | 260/453 SP |
| 3,816,496 | 6/1974 | Schnabel | 260/453 SP |

*Primary Examiner*—Norman Yudkoff
*Assistant Examiner*—Frank Sever
*Attorney, Agent, or Firm*—Denis A. Firth; John Kekich

[57] ABSTRACT

The acidity and hydrolyzable chloride levels of polymethylene polyphenyl polyisocyanates are reduced (and the reactivity correspondingly increased) by exposing the polyisocyanate, in solution in inert organic solvent, to heating at a temperature of 150°C to 230°C and under a pressure in the range of 20 psia to 60 psia with removal of volatile overhead. The process can be carried out continuously or in a batch procedure. The polyisocyanate so treated, in addition to lowered acidity and hydrolyzable chloride, is found to be substantially free of impurities which give rise to offensive odors when the polyisocyanate is employed in the preparation of flexible foams.

6 Claims, 1 Drawing Figure

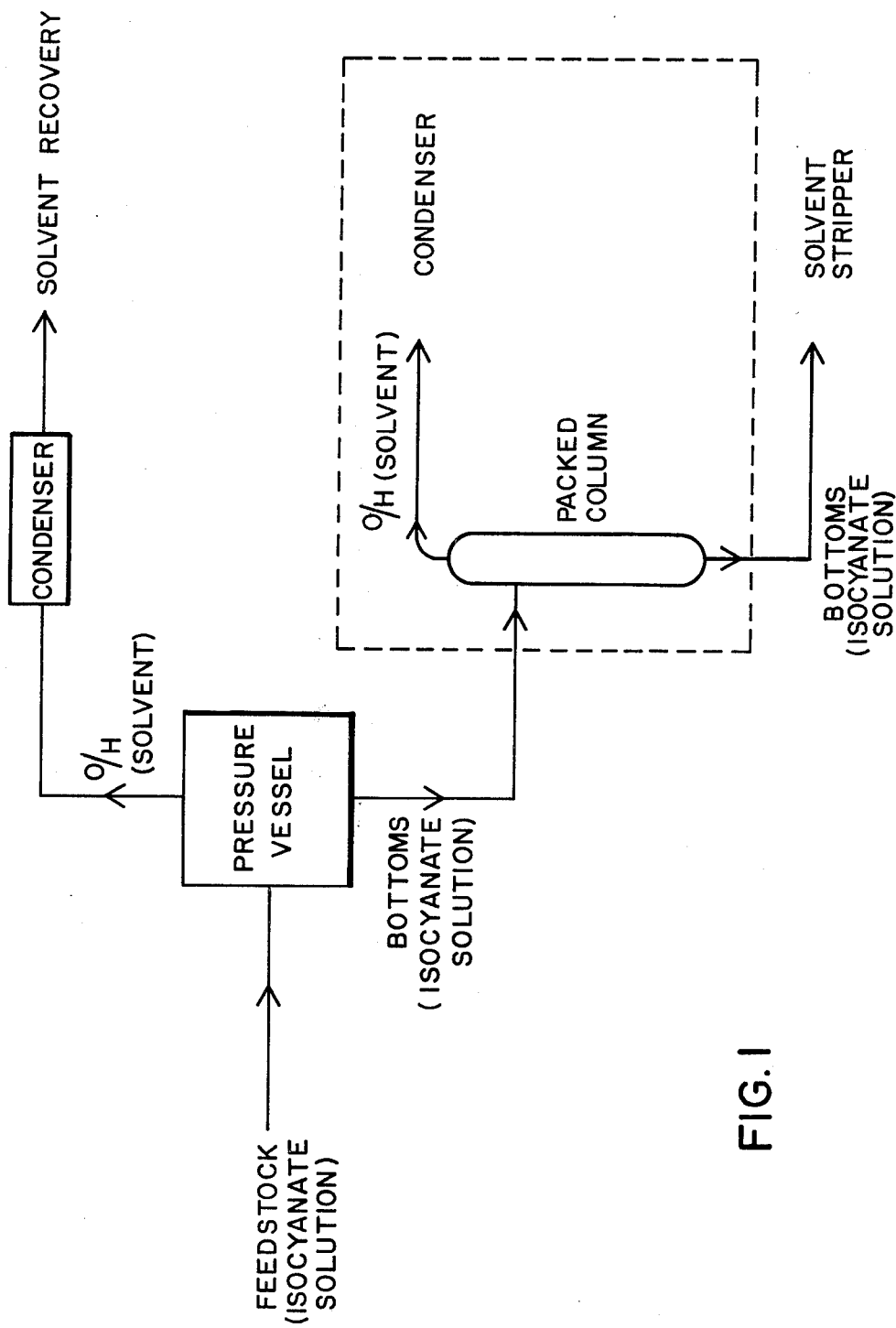
FIG. I 3,912,600

RECOVERY OF POLYMETHYLENE POLYPHENYL POLYISOCYANATE FROM A PHOSHENOSED POLYAMINE FEED

BACKGROUND OF THE INVENTION

1. Field of the Invention

This invention relates to improvements in the preparation of polyisocyanates and, more particularly, is concerned with a process for reducing the acidity and hydrolyzable chloride levels in polymethylene polyphenyl polyisocyanates.

2. Description of the Prior Art

It is well recognized in the art that the presence of free hydrogen chloride, and a wide variety of by-products containing hydrolyzable chloride, produced during the preparation of polyisocyanates by phosgenation of the corresponding amines, has an adverse effect on the rate of reaction of polyisocyanates with active-hydrogen-containing materials such as polyols. This is particularly so in the case of polymethylene polyphenyl polyisocyanates, i.e., the products derived by phosgenation of the mixture of polyamines obtained in the acid condensation of aniline and formaldehyde.

Various methods of adjusting the reactivity and/or lowering the hydrolyzable chloride content of such polyisocyantes have been described. For example, the addition of various metals, as well as metal salts and organo-metallic derivatives, has been suggested; U.S. Pat. Nos. 3,155,699; 3,264,336; 3,373,182; and 3,458,558. Fractional distillation to achieve the above objects is described in U.S. Pat Nos. 3,264,336, and a combination of fractional distillation under reduced pressure and purging with inert gas is described in U.S. Pat. No. 3,549,504. U.S. Pat. No. 3,516,950 discloses passing an inert gas through heated polyisocyanate as a means of reducing hydrolyzable chloride. British Specification 1,080,717 describes substantially the same procedure.

In addition to the problem of controlling the level of acidity and hydrolyzable chloride, it has been found that the use of the above polymethylene polyphenyl polyisocyanates, either alone or in combination with toluene diisocyanate in the preparation of flexible foams, (which use has become very prevalent recently), wherein basic catalysts are employed, gives rise to foams which have a distressingly foul odor. Such foams must be deodorized prior to use in cushioning and like applications and the process of deodorizing adds greatly to the cost of the foam. Accordingly, it is highly desirable that whatever impurity in the polyisocyanate is responsible for generation of the foul odor be removed before the polyisocyanate is used to generate foam. In addition to use in foams, polyisocyanates containing the above impurity give the same foul odor when employed for any purpose in which they are brought into contact with basic materials. The odor is believed caused by generation of isonitriles (carbylamines) by base-decomposition of the impurities in the polyisocyanate.

We have now found that both problems, namely, control of acidity of removal of odor-causing impurities, can be solved by use of a simple but elegant procedure which does not require addition of extraneous material to the polyisocyanate and which is also readily adaptable for incorporation into existing continuous processes for the preparation of such polyisocyanates.

SUMMARY OF THE INVENTION

This invention comprises a process for lowering the acidity and hydrolyzable chloride content of a polymethylene polyphenyl polyisocyanate which comprises subjecting said polyisocyanate, in the form of a solution in an inert organic solvent, to treatment at a pressure in the range of about 20 psia to about 60 psia and at a temperature in the range of about 150°C to about 230°C, with removal of volatile overhead.

The invention also comprises means for employing the process on a continuous basis as an integral part of a continuous process for the manufacture of polymethylene polyphenyl polyisocyanates.

DETAILED DESCRIPTION OF THE INVENTION

The "acidity" or "acid value," sometimes referred to as "hot acidity," of a polyisocyanate is a term well recognized in the art. The acidity is determined by potassium hydroxide titration of the free acid generated upon subjecting a measured quantity of polyisocyanate to a brief period of heating in methanol. The "hydrolyzable chloride" content of a polysiocyanate is also a well-recognized parameter which is determined by estimation (by silver nitrate titration) of the chloride ion generated by boiling a measured amount of polyisocyanate in a mixture of toluene and methanol.

The process of the invention is, in essence, a partial stripping under superatmospheric pressure of a solution of polymethylene polyphenyl polyisocyanate. In carrying out the process of the invention the polyisocyanate employed as feedstock is a mixture of polymethylene polyphenyl polyisocyanates which has been obtained by phosgenation of the corresponding mixture of polyamines, the latter having been prepared by condensation of aniline and formaldehyde by well-recognized procedures of the art. Such mixtures of polymethylene polyphenyl polyisocyanates generally contain from about 35 to about 85 percent by weight of methylenebis(phenyl isocyanate), the remainder of said mixture being polymethylene polyphenyl polyisocyanates of higher functionality.

The feedstock polyisocyanate is employed in the form of a solution in an inert organic solvent. By the latter is meant an organic solvent which is inert, i.e., does not enter into reaction with the polyisocyanate or interfere in any way with the process which is being carried out. Examples of inert organic solvents are toluene, xylene, decalin, monochlorobenzene, dichlorobenzene, and the like. The concentration of polyisocyanate present in solution in the inert organic solvent is not critical but is generally within the range of about 10 to about 80 percent by weight.

In a preferred embodiment of the invention the feedstock is employed in the form of the reaction product, in solution in the inert organic solvent employed in the raction, which has been derived by phosgenation of the corresponding polyamines in a continuous process for the manufacture of polymethylene polyphenyl polyisocyanates from aniline and formaldehyde. In such a case, a minor portion of the reaction solvent can, if desired, be removed by stripping under reduced pressure prior to submitting the feedstock to the process of the invention. In general, however, the complete reaction solution is employed as feedstock without any prior removal of a portion of the solvent.

The feedstock polyisocyanate is charged to a vessel which is capable of withstanding internal pressures of the order of at least about 60 psia. This vessel can be any of those commonly available in commercial operations but preferably takes the form of a so-called "flash" vessel.

At the time of charging to the vessel, the feedstock is advantageously already at the desired temperature, within the range of about 150°C to about 230°C, for carrying out the process of the invention. Alternatively, but less preferably, the feedstock can be charged to the vessel at a lower temperature and subsequently heated to a temperature in the above range in order to carry out the process of the invention. Preferably, the temperature of the feedstock in the vessel is maintained within the range of about 170°C to about 220°C throughout the process of the invention.

In addition to maintaining the above temperature range, the pressure in the vessel containing the feedstock is maintained at superatmospheric pressure. Advantageously the pressure maintained in the vessel containing the feedstock is within the range of about 20 psia (i.e., 6 psi above normal atmospheric pressure) to about 60 psia (i.e. 46 psi above normal atmospheric pressure) and preferably, is within the range of about 25 psia to about 55 psia.

The most appropriate choice of reaction temperature and pressure in any given instance can be determined by a process of trial and error. In general, the higher the pressure (within the above range) the lower the necessary temperature (within the above range) to accomplish the desired result, and vice versa.

Provision is made for removal of volatile material (i.e., solvent plus entrained material which is gaseous under the conditions of temperature and pressure employed) from the vessel containing the feedstock during the time for which the latter is present. For example, the vessel can be provided with a vent valve or the like or, alternatively, the vessel can be provided with a condenser interposed between the main vessel and a vent valve. The gaseous volatile material removed from the feed polyisocyanate in this manner, either continuously in a preferred embodiment or in increments, constitutes mainly inert organic solvent which is enriched in content of the impurities in said feedstock, or the breakdown products of such impurities, which are responsible for the acidity, hydrolyzable chloride, and odor-producing characteristics of said feed.

The proportion of inert organic solvent taken as volatile overhead in the process of the invention can vary over a wide range of about 10 to 90 percent by volume of the inert organic solvent present in the feed. The appropriate amount of volatile overhead taken in any given instance is governed by the configuration of the apparatus as well as by the operating conditions.

The residence time for which the feedstock is maintained in the vessel under the conditions of temperature and pressure defined above, varies according to the precise combination of the latter conditions which is employed. Advantageously, the residence time is not less than about 10 minutes and not more than 50 minutes. Preferably, the residence time lies within the range of about 15 minutes to about 40 minutes.

In a preferred embodiment of the process of the invention the treatment of the feed polyisocyanate under superatmospheric pressure and elevated temperature, within the limits set forth above, is carried out on a continuous basis. In this embodiment the feed polyisocyanate is charged continuously, at a predetermined rate, to an inlet port located at approximately the liquid surface in the reaction vessel, and treated polyisocyanate is withdrawn continuously, at substantially the same rate as the feed is being charged, from an exit port located in the lower regions of the vessel. The rate of feeding and the corresponding rate of withdrawal are so chosen that the average residence time of the polyisocyanate in the pressure vessel falls within the limits set forth above. As in the previously described embodiment, provision is made for removal of volatile overhead from the pressure vessel.

In carrying out the process of the invention on a continuous basis in the manner described above, it is preferable to preheat the feed polyisocyanate to the temperature, within the range set forth above, desired for the treatment in the pressure vessel and to charge the preheated feed under pressure to the pressure vessel.

In the most desirable situation the process of the invention is carried out continuously, as one part of the process of isolating the product obtained in a continuous process for the preparation of polymethylene polyphenyl polyisocyanate. In such processes aniline and formaldehyde are condensed, generally but not necessarily in the presence of acid, on a continuous basis to form a mixture of polymethylene polyphenyl amines, and the latter mixture, after neutralizing any acid employed in the condensation, is subjected to phosgenation in inert organic solvent solution on a continuous basis to produce a solution of polymethylene polyphenyl polyisocyanates. The latter is purged of excess phosgene and hydrogen chloride and subjected to solvent stripping under reduced pressure to recover the desired polymethylene polyphenyl isocyanate. The process of the invention is preferably inserted in the above sequence of steps so that it is carried out after the phosgene purging step but before the solvent stripping step.

In a particularly preferred embodiment of a continuous process according to the invention the treated polyisocyanate, which is removed on a continuous basis from the exit port of the pressure vessel, is charged to the upper portion of a packed column through which said treated polyisocyanate flows downwardly while still being maintained within the same range of pressure and temperature as those prevailing in the pressure vessel itself. The volatile material taken overhead from the pressure vessel can, if desired, be fed to the lower portion of said packed column so that it flows upwardly and countercurrently to the liquid flowing down the column and thereby serves to scrub volatile material from the latter. The packed column is provided in the upper part thereof with means for removing volatile overhead in the same manner as for the pressure vessel.

The packing in the column employed in the above embodiment can take a variety of forms such as Raschig rings, wire mesh, ceramic pieces such as those sold under the name Intalox saddles, marble chips, and metallic rings such as those sold under the name of Flexirings or Pall rings.

The relative capacities of column and pressure vessel in the above-described combination are not critical and the choice to be made in any particular instance will be based on recognized engineering practice. Generally the relative capacities and configuration of the two will be so chosen as to give a total average rsidence time in the system, i.e. the average time taken for a given increment of feed to pass from the inlet port of the pressure vessel to the exit port at the lower end of the packed column, within the order of about 10 minutes to about 50 minutes.

If desired, the treated polyisocyanate removed from the exit port of the pressure vessel, or from the exit port of the packed column, if one is used, can be recycled to reduce the hydrolyzable chloride, acidity, and/or level of odor-causing impurities to an even lower level. Alternatively, the average residence time in the system can be reduced and the product recycled one or more times until the total residence time for the treated polyisocyanate in the system reaches the desired rsidence times set forth above for the various systems.

Contrary to expectations, based on the known and highly undesirable result of exposure of polymethylene polyphenyl polyisocyanates to heat for any significant period of time, the feed polyisocyanate, after being submitted to the process of the invention, shows no significant increase in viscosity or of distribution of isomers or any other change normally indicative of either polymerization or degradation of any of the various components of thhe polymethylene polyphenyl polyisocyanate mixture. Further, the reduction of acidity and hydrolyzable chloride content which is achieved by the process of the invention is markedly superior to the reduction of these values which can be obtained by subjecting the same polyisocyanates to the action of heat at atmospheric pressure and in the substantial absence of any inert organic solvent.

The following examples describe the manner and process of making and using the invention and set forth the best mode contemplated by the inventors of carrying out the invention but are not to be construed as limiting. The determinations of acidity and hydrolyzable chloride were carried out using the procedures described in U.S. Pat. No. 3,793,362 immediately prior to Example 1 therein. The tests for the presence of impurities which give rise to undesirable odors when used to prepare flexible foams using formulations catalyzed by basic catalysts were carried out in one of two ways:

a. a 2 ml. sample of isocyanate is agitated for 30 seconds with 2 ml. of 25 percent w/v aqueous sodium hydroxide and the mixture is allowed to stand, with a loosely-fitting cover over the receptacle, for 1 hr. At the end of that time, the mixture is checked for traces of odor (carbylamine odor).

b. A 500 g. sample of isocyanate is used to prepare a flexible polyurethane foam using a standard commercial form formulation with triethylenediamine catalysis. The resulting foam is cut after one day and checked for presence or absence of odor.

EXAMPLE 1

The following apparatus and procedure was employed in carrying out a series of runs at different temperatures and pressures using the same feedstock.

The feed polyisocyanate in each run was a solution (21.4 percent by weight) of polymethylene polyphenyl polyisocyanate [containing approximately 50 percent by weight of methylenebis(phenyl isocyanate), the remainder of the mixture being oligomers of higher functionality] in chlorobenzene taken as an aliquot from a commercial plant production run prior to the solvent stripping stage. A sample of the feed was evaporated under reduced pressure to remove solvent and was then found to have the following properties:

| Isocyanate equivalent | : | 131.4 |
| % Hot HCl | : | 0.12 |
| % Hydrolyzable Cl | : | 0.16 |
| % Total hydrolyzable Cl | : | 0.42 |
| Odor by both tests (a) and (b): | | strong |

In each of the runs carried out with this feed, the latter was fed at the rate of 105 – 125 g. per minute to a 1 gallon autoclave equipped with take-off tube for removing volatile overhead to a condenser. The rate at which treated undistilled isocyanate was removed from the autoclave was adjusted, in convert with the rate at which volatile overhead was removed, so as to maintain a liquid hold up in the autoclave of about 1,400 g. The equipment was provided with appropriate pressure valves so that the material could be maintained at any desired pressure while present in the autoclave. In each run an aliquot of the liquid material removed from the autoclave was taken, evaporated under reduced pressure to remove solvent, and submitted to the analyses set forth in Table I below. Simultaneously, an aliquot was taken from the condensate derived from the volatile overhead and the aliquot was evaporated to remove solvent and submitted to the analyses set forth in Table I. It will be seen from the results in Table I that the treated polyisocyanate recovered from the autoclave in each of the runs possessed markedly reduced acidity and hydrolyzable chloride levels and markedly improved behavior in regard to generation of offensive odor on treatment with base. in contrast, the volatile material taken overhead was markedly enriched in acidity and hydrolyzable chloride content.

The "residence time" quoted in Table I for each run is the calculated average time for which an increment of feed polyisocyanate was present in the autoclave.

TABLE I

| Run Number | 1 | 2 | 3 | 4 | 5 | 6 |
| --- | --- | --- | --- | --- | --- | --- |
| Residence Time (min.) | 25 | 24 | 26 | 19 | 29 | 27 |
| Pressure, PSIG | 24 | 25 | 11 | 11 | 11 | 25 |
| Autoclave Liquid Temp. °C. | 218 | 212–221 | 183 | 149 | 226–235 | 207–218 |
| Stripped Autoclave Bottoms: | | | | | | |
| Isocyanate Equivalent | 133.9 | 133.7 | 133.2 | 132.7 | 142.5 | 138.0 |
| % Monochlorobenzene (MCB) (by distillation) | 22.0 | 21.0 | 16.1 | 37.7 | 4.1 | 11.9 |
| % Hot HCl | .028 | .021 | .034 | .076 | .047 | .022 |
| % Hydrolyzable Cl$^-$ | .046 | .052 | .068 | .13 | .057 | .053 |
| % Total Hydrolyzable Cl$^-$ | .30 | .28 | .30 | .35 | .19 | .16 |
| Volatile Overhead: | | | | | | |
| % MCB | | 97.3 | 98.1 | 98.7 | 93.5 | 96.3 |
| On MCB Free Basis | | | | | | |
| % Hot HCl | | 2.04 | .84 | .38 | .46 | .65 |
| % Hydrolyzable Cl$^-$ | | 2.37 | 1.26 | 1.69 | .52 | .68 |
| % Total Hydrolyzable Cl$^-$ | | 2.37 | 1.26 | 1.77 | .63 | .76 |
| Odor: Method (a) | | | | | | |

TABLE I-continued

| Run Number | 1 | 2 | 3 | 4 | 5 | 6 |
|---|---|---|---|---|---|---|
| Autoclave Bottoms | + | faint | + | + | − | − |

EXAMPLE 2

Two further runs were carried out using the same apparatus and operating procedure as described in Example 1 but replacing the feed polyisocyanate there used by a second feed taken from a later commercial plant run and containing 21 percent by weight of polymethylene polyphenyl polyisocyanate (diisocyanate content approximately 50 percent) in monochlorobenzene. An aliquot of this feed was evaporated under reduced pressure to remove solvent and the sample of polyisocyanate so obtained possessed the following analysis:

| | | |
|---|---|---|
| Isocyanate equivalent | : | 131.5 |
| % Hot HCl | : | 0.16 |
| % Hydrolyzable Cl | : | 0.18 |
| % Total hydrolyzable Cl | : | 0.49 |
| Odor by both tests (a) and (b): | | strong |

In one of the runs (Run 7) the autoclave was run at atmospheric pressure and a low temperature (118°C), whereas the second run (Run 8) was run at a pressure and temperature within the range of the process of the present invention. It will be seen from the results of the two runs summarized in Table II below that Run 8, carried out in accordance with the process of the invention, produced dramatic reduction in the acidity and hydrolyzable chloride content of the feed and eliminated the odor causing impurities therein. In contrast the run (Run 7) carried out under conditions of pressure and temperature outside the range of the process of the invention caused substantially no change in the acidity and hydrolyzable chloride levels or the level of odor causing impurities.

TABLE II

| Run Number | 7 | 8 |
|---|---|---|
| Residence Time (min.) | 13 | 23 |
| Pressure, PSIG | 0 | 25 |
| Autoclave Liquid Temp. °C. | 118 | 196–204 |
| Stripped Autoclave Bottoms: | | |
| Isocyanate Equivalent | 132.4 | 136.4 |
| % Monochlorobenzene (MCB) (by distillation) | 57.2 | 24.7 |
| % Hot HCl | 0.13 | 0.031 |
| % Hydrolyzable Cl | 0.14 | 0.039 |
| % Total Hydrolyzable Cl | 0.44 | 0.26 |
| Volatile Overhead: | | |
| % MCB | 98.6 | 97.6 |
| On MCB Free Basis | | |
| % Hot HCl | 2.14 | 1.50 |
| % Hydrolyzable Cl | 2.50 | 1.63 |
| % Total Hydrolyzable Cl | 3.64 | 1.63 |
| Odor: Method (a) | | |
| Autoclave Bottoms | + | − |

EXAMPLE 3

The apparatus and procedure described in Example 1 was modified by leading the undistilled bottoms fraction to the upper part of a column (6 ft. × 2 in.) packed with ⅛ inch diameter ceramic saddles. The fluid in the column was maintained under the same conditions of pressure and temperature as the isocyanate in the autoclave. The volatile overhead from the autoclave was fed to an inlet port at the lower end of the packed column and volatile overhead was recovered at the head of the column. The following runs, set forth in Table III, were carried out using the above apparatus and procedure and using an average hold up of luquid in the autoclave of 730 grams. Runs 9 – 12 were carried out using a polymethylene polyphenyl polyisocyanate feedstock having the following properties:

| | | |
|---|---|---|
| % MCB | : | 79.3 |
| Isocyanate equivalent | : | 130.7 |
| % Hot HCl | : | 0.18 |
| % Total hydrolyzable Cl | : | 0.55 |
| Odor by both tests (a) and (b) | : | strong |

Runs 13 – 17 were carried out using a polymethylene polyphenyl polysiocyanate feedstock having the following properites:

| | | |
|---|---|---|
| % MCB | : | 81.5 |
| Isocyanate equivalent | : | 131.7 |
| % Hot HCl | : | 0.17 |
| % Total hydrolyzable Cl | : | 0.50 |
| Odor by both tests (a) and (b): : | strong | |

During each run aliquots of material recovered from the undistilled bottoms fractions leaving the autoclave and leaving the column were evaporated to dryness and submitted to analyses. The results are shown in Table III. It will be seen from the results shown in Table III that very marked reduction in acidity and hydrolyzable chloride, and in odor producing impurites, was found in the material leaving the autoclave and leaving the bottom of the packed column and that this was achieved with only a very minor increase in isocyanate equivalent (corresponding to a loss of less than 2 percent of isocyanate groups).

TABLE III

| Run Number | 9 | 10 | 11 | 12 | 13 | 14 | 15 | 16 | 17 |
|---|---|---|---|---|---|---|---|---|---|
| Residence Time (Autoclave) (min.): | — | 17.0 | 12.6 | 16.5 | 15.0 | 14.7 | 8.8 | 6.6 | 19.4 |
| Pressure, PSIG | 25 | 30 | 35 | 25 | 40 | 40 | 25 | 30 | 35 |
| Autoclave Liquid Temp. °C. | 221 | 204 | 218 | 215 | 204 | 218 | 193 | 193 | 210 |
| Stripped Autoclave Bottoms: | | | | | | | | | |
| Isocyanate Equiv. | — | * | * | * | * | * | * | * | 132.7 |
| % MCB (by dist.) | — | 35.6 | 60.0 | 47.8 | 52.6 | 53.7 | 72.0 | 78.4 | 30.4 |
| % Hot HCl | — | .07 | .09 | .07 | .08 | .11 | .14 | .12 | .06 |

TABLE III-continued

| Run Number | 9 | 10 | 11 | 12 | 13 | 14 | 15 | 16 | 17 |
|---|---|---|---|---|---|---|---|---|---|
| % Total Hyd. Cl$^-$ | — | .34 | .44 | .41 | .30 | .33 | — | — | .33 |
| Stripped Column Bottoms: | | | | | | | | | |
| Isocyanate Equiv. | 133.6 | 133.5 | 132.7 | 132.6 | 132.5 | 132.4 | 132.7 | 132.6 | 133.1 |
| % MCB (by dist.) | 66.0 | 59.0 | 38.0 | 47.0 | 74.3 | 80.0 | 50.0 | 54.7 | 56.8 |
| % MCB (GLC) | .07 | .049 | .093 | .023 | .25 | .010 | .039 | .043 | .144 |
| % Hot HCl | .041 | .032 | .032 | .04 | .06 | .059 | .06 | .08 | .06 |
| % Total Hyd. Cl$^-$ | .468 | — | — | — | — | — | .32 | .33 | .35 |
| Odor: Method (a) | | | | | | | | | |
| Autoclave Bottoms | faint | faint | faint | faint | + | faint | + | faint | faint** |
| Column Bottoms | — | — | — | — | — | — | faint | faint | faint** |

*Not determined; insufficient sample.
**Method (b)

We claim:

1. In a process for recovering a polymethylene polyphenyl polyisocyanate from a solution of said polyisocyanate in an organic solvent selected from the group consisting of toluene, xylene, decalin, monochlorobenzene and dichlorozbenzene said solution being the product obtained by phosgenation of the polymethylene polyphenyl polyamine, the improvement which comprises charging said polyisocyanate solution, after purging of phosgene but prior to stripping the bulk of said organic solvent, to a flash vessel and maintaining said solution therein at a pressure in the range of about 20 psia to about 60 psia and at a temperature in the range of about 150°C to about 230°C, said temperature being below the boiling point of said polyisocyanate at the pressure employed, for a time in the range of about 10 to 50 minutes with removal of a portion of the inert organic solvent as volatile overhead.

2. The process of claim 1 wherein the inert solvent is monochlorobenzene.

3. The process of claim 2 wherein from about 10 to about 90 percent by volume of the monochlorobenzene is removed continuously as volatile overhead during the treatment.

4. In a process for recovering a polymethylene polyphenyl polyisocyanate from a solution of said polyisocyanate in an organic solvent selected from the group consisting of toluene, xylene, decalin, monochlorobenzene and dichlorobenzene said solution being the product obtained by phosgenation of the polymethylene polyphenyl polyamine, the improvement which comprises the steps of:

a. continuously charging said polyisocyanate solution, after purging of phosgene but prior to stripping the bulk of said organic solvent to a flash vessel in which the pressure is maintained within the range of about 20 psia to about 60 psia and the temperature of the contents of said flash vessel lies within the range of about 150°C to about 230°C, said temperature being below the boiling point of said polyisocyanate at the pressure employed;

b. continuously withdrawing a minor proprtion of the organic solvent from said flash vessel as volatile overhead;

c. continuously withdrawing polyisocyanate bottoms from said flash vessel at a rate such that the average residence time in said vessel is maintained within the range of about 10 minutes to about 50 minutes;

d. continuously passing said withdrawn polyisocyanate bottoms to the top of a packed distillation column maintained at a temperature of about 150°C to about 230°C and a pressure of about 20 psia to about 60 psia, said temperature being below the boiling point of said polyisocyanate at the pressure employed in said column;

e. continuously removing polyisocyanate bottoms from the lower portion of said packed column; and f. continuously removing a minor proportion of the organic solvent as volatile overhead from said packed distillation column.

5. A process according to claim 4 wherein the volatile overhead removed from the pressure vessel is fed to the lower part of the heated packed column.

6. A process according to claim 4 wherein the inert organic solvent is monochlorobenzene.

* * * * *

UNITED STATES PATENT OFFICE
CERTIFICATE OF CORRECTION

Patent No. 3,912,600                Dated October 14, 1975

Inventor(s) Richard Hatfield, Jr. and Howard R. Steele

It is certified that error appears in the above-identified patent and that said Letters Patent are hereby corrected as shown below:

| Column 6, Line 27: | Should read: |
|---|---|
| in convert | in concert |
| Column 7, Line 13: | Should read: |
| containing 211 percent | containing 21.1 percent |

Signed and Sealed this sixth Day of January 1976

[SEAL]

Attest:

RUTH C. MASON
Attesting Officer

C. MARSHALL DANN
Commissioner of Patents and Trademarks